(12) United States Patent
Hamada

(10) Patent No.: US 11,054,837 B2
(45) Date of Patent: Jul. 6, 2021

(54) AUTONOMOUS MOBILE APPARATUS ADAPTABLE TO CHANGE IN HEIGHT, AUTONOMOUS MOVEMENT METHOD AND NON-TRANSITORY COMPUTER-READABLE RECORDING MEDIUM

(71) Applicant: CASIO COMPUTER CO., LTD., Tokyo (JP)

(72) Inventor: Akira Hamada, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 639 days.

(21) Appl. No.: 15/920,618

(22) Filed: Mar. 14, 2018

(65) Prior Publication Data

US 2018/0275677 A1     Sep. 27, 2018

(30) Foreign Application Priority Data

Mar. 27, 2017   (JP) .............................. JP2017-061857

(51) Int. Cl.
*G05D 1/02*     (2020.01)
*G06N 3/00*     (2006.01)
(Continued)

(52) U.S. Cl.
CPC .......... *G05D 1/0246* (2013.01); *A63H 11/00* (2013.01); *A63H 29/22* (2013.01); *G05D 1/0221* (2013.01);
(Continued)

(58) Field of Classification Search
CPC .. G05D 1/0246; G05D 1/0274; G05D 1/0221; G05D 2201/0214; G05D 1/0214;
(Continued)

(56) References Cited

U.S. PATENT DOCUMENTS

| | | | |
|---|---|---|---|
| 6,374,157 B1 | 4/2002 | Takamura | |
| 2006/0025888 A1* | 2/2006 | Gutmann | ................ G06T 7/593 700/245 |

(Continued)

FOREIGN PATENT DOCUMENTS

| | | |
|---|---|---|
| CN | 1309597 A | 8/2001 |
| JP | 2005-144612 A | 6/2005 |

(Continued)

OTHER PUBLICATIONS

Notification of Reasons for Refusal dated Jul. 23, 2019 received in Japanese Patent Application No. JP 2017-061857 together with an English language translation.

(Continued)

*Primary Examiner* — Abby Y Lin
*Assistant Examiner* — Renee LaRose
(74) *Attorney, Agent, or Firm* — Scully Scott Murphy & Presser

(57) ABSTRACT

An autonomous mobile apparatus includes a controller, an image acquirer, an inertia measurer, a distance measurer, and a storage. The controller updates environment map information stored in the storage. The controller estimates a height from a reference surface, based on an image obtained by the image acquirer. The inertia measurer detects an amount of fluctuation of the height. The distance measurer detects whether or not the bottom portion of the autonomous mobile apparatus is in contact with an object. The controller, if having detected a change in height equal to or larger than a reference from information obtained from the image acquirer, the inertia measurer, or the distance measurer, stops updating the environment map information or deletes the environment map information.

13 Claims, 9 Drawing Sheets

(51) Int. Cl.
    *A63H 29/22*     (2006.01)
    *A63H 11/00*     (2006.01)

(52) U.S. Cl.
    CPC ........... *G05D 1/0274* (2013.01); *G06N 3/008* (2013.01); *A63H 2200/00* (2013.01); *G05D 2201/0214* (2013.01); *Y10S 901/01* (2013.01); *Y10S 901/47* (2013.01)

(58) Field of Classification Search
    CPC .. G05D 1/0223; G05D 1/0253; G05D 1/0276; A63H 11/00; A63H 29/22; A63H 2200/00; G06N 3/008; Y10S 901/47; Y10S 901/01
    See application file for complete search history.

(56) References Cited

U.S. PATENT DOCUMENTS

| | | | | |
|---|---|---|---|---|
| 2007/0250213 | A1* | 10/2007 | Poljen | B25J 9/1671 |
| | | | | 700/264 |
| 2013/0338831 | A1* | 12/2013 | Noh | B25J 9/0003 |
| | | | | 700/259 |
| 2016/0353959 | A1 | 12/2016 | Lindhe et al. | |
| 2020/0022551 | A1* | 1/2020 | Watanabe | A47L 9/30 |

FOREIGN PATENT DOCUMENTS

| | | |
|---|---|---|
| JP | 2006-234453 A | 9/2006 |
| JP | 2006-290195 A | 10/2006 |
| JP | 2009-193240 A | 8/2009 |
| JP | 2014-059764 A | 4/2014 |
| JP | 2014-194729 A | 10/2014 |
| JP | 2016-193466 A | 11/2016 |
| JP | 2017-502372 A | 1/2017 |
| WO | 00/32360 A1 | 6/2000 |

OTHER PUBLICATIONS

Notification of Reasons for Refusal dated Mar. 12, 2019 received in Japanese Patent Application No. JP 2017-061857 together with an English language translation.

First Office Action dated Sep. 25, 2020 issued in Chinese Patent Application No. 20180249479.0.

Notice of Reasons for Refusal dated Oct. 15, 2019 received in Japanese Patent Application No. JP 2017-061857 together with an English language translation.

\* cited by examiner

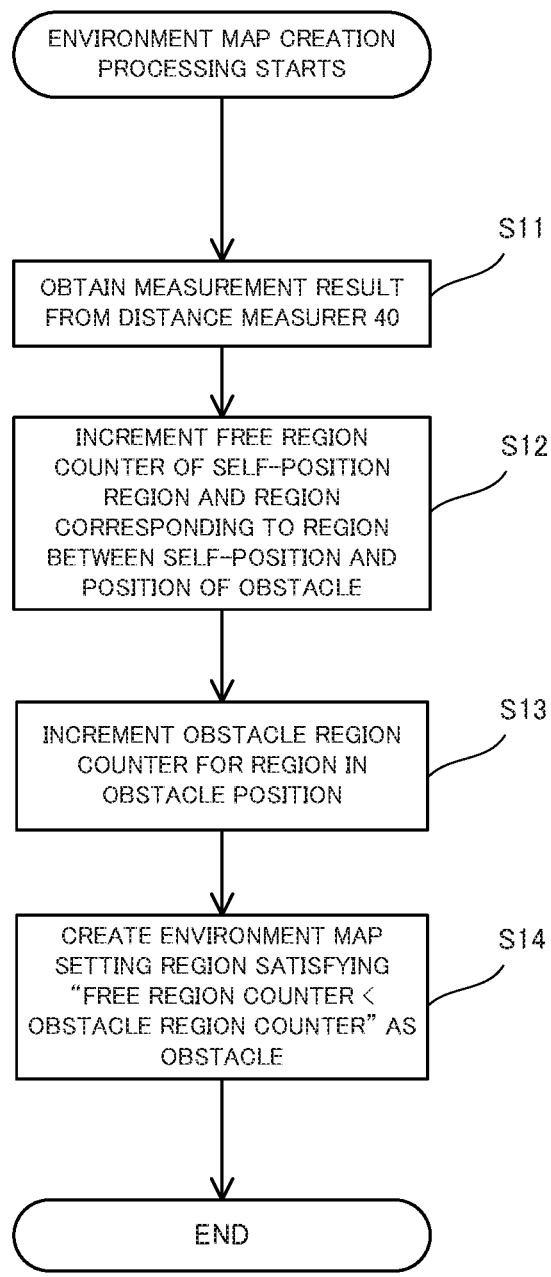

FIG. 8A

OBSTACLE REGION GRID

| 1 | 1 | 1 | 1 |
|---|---|---|---|
| 1 | 5 | 5 | 1 |
| 1 | 1 | 1 | 1 |
| 1 | 1 | 1 | 1 |

FIG. 8B

FREE REGION GRID

| 4 | 4 | 4 | 4 |
|---|---|---|---|
| 3 | 0 | 0 | 4 |
| 3 | 3 | 3 | 3 |
| 3 | 3 | 3 | 3 |

FIG. 8C

ENVIRONMENT MAP

| 0 | 0 | 0 | 0 |
|---|---|---|---|
| 0 | 1 | 1 | 0 |
| 0 | 0 | 0 | 0 |
| 0 | 0 | 0 | 0 |

AUTONOMOUS MOBILE APPARATUS ADAPTABLE TO CHANGE IN HEIGHT, AUTONOMOUS MOVEMENT METHOD AND NON-TRANSITORY COMPUTER-READABLE RECORDING MEDIUM

CROSS-REFERENCE TO RELATED APPLICATION

This application claims the benefit of Japanese Patent Application No. 2017-061857, filed on Mar. 27, 2017, the entire disclosure of which is incorporated by reference herein.

FIELD

The present disclosure relates to an autonomous mobile apparatus, an autonomous movement method, and a non-transitory computer-readable recording medium.

BACKGROUND

Autonomous mobile apparatuses, such as robots and unmanned carriers have been developed. For example, Unexamined Japanese Patent Application Kokai Publication No. 2014-194729 discloses an autonomous mobile apparatus that moves while creating map information, and can detect a concave region lower than a floor surface.

SUMMARY

According to an aspect of the present disclosure, an autonomous mobile apparatus performs autonomous movement by referring to environment map information, and includes an environment map information updater that updates the environment map information, and a detector that detects a change in height. When the detector detects the change in height that is equal to or larger than a reference, the environment map information updater stops updating the environment map information or deletes the environment map information.

BRIEF DESCRIPTION OF THE DRAWINGS

A more complete understanding of this application can be obtained when the following detailed description is considered in conjunction with the following drawings, in which:

FIG. 7 is a flowchart of an environment map creation processing according to Embodiment 2 of the present disclosure;

FIG. 8A is a diagram illustrating an obstacle region grid in the creation process in environment map creation processing according to Embodiment 2 of the present disclosure;

FIG. 8B is a diagram illustrating a free region grid in the creation process in environment map creation processing according to Embodiment 2 of the present disclosure;

FIG. 8C is a diagram illustrating an environment map in the creation process in environment map creation processing according to Embodiment 2 of the present disclosure;

DETAILED DESCRIPTION

With reference to the drawings, the following describes embodiments in which an autonomous mobile apparatus according to the present disclosure is applied to a pet robot.

Embodiment 1

Figure 1:
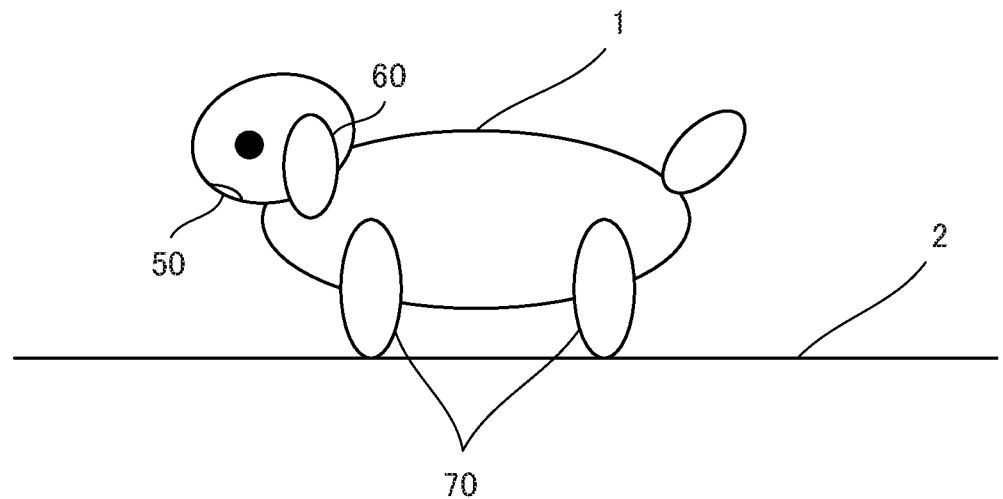
FIG. 1 is an external view of a pet robot according to Embodiment 1 of the present disclosure.

As illustrated in FIG. 1, a pet robot 1 according to the present embodiment is a moving apparatus that walks on a floor surface 2. The pet robot 1 includes a leg portion 70 to be in contact with the floor surface 2, and can autonomously move by autonomously operating the leg portion 70.

The pet robot 1 further includes a sound outputter 50 and a sound inputter 60. The pet robot 1 can output a sound via the sound outputter 50, and convey information to a user to a certain level. The pet robot 1 imitates a pet. Therefore, instead of uttering a linguistic sound, a pet robot 1 that imitates a dog for example would utter a sound "bow-wow," imitating the barking of a dog. This is merely one example, and the pet robot 1 may speak a human language.

The pet robot 1 obtains a sound via the sound inputter 60, recognizes the language uttered by the user, and understands an instruction to a certain level. For example, the pet robot 1 can recognize a sound "Wait." uttered by a user, and understand that an instruction to stop an autonomous movement has been given.

Figure 2:
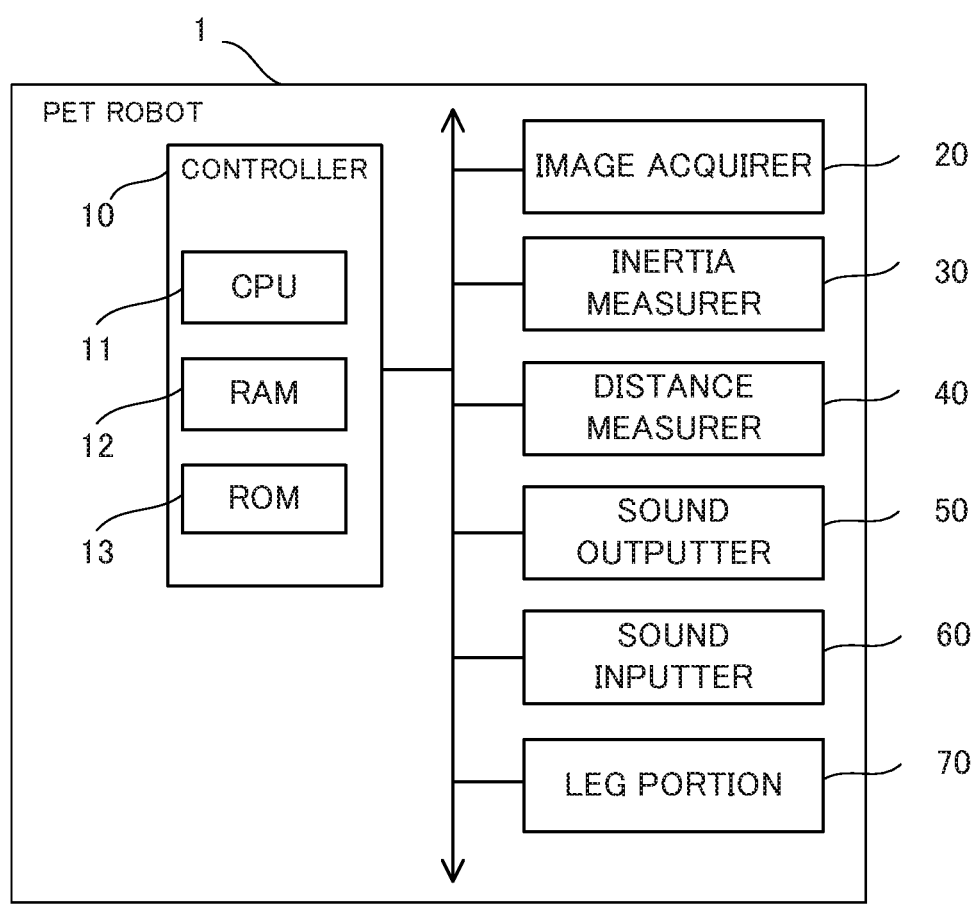
FIG. 2 is a configuration diagram of the pet robot according to Embodiment 1 of the present disclosure.

Next, the internal structure of the pet robot 1 is explained with reference to FIG. 2. The pet robot 1 includes a controller 10, an image acquirer 20, an inertia measurer 30, a distance measurer 40, a sound outputter 50, a sound inputter 60, and a leg portion 70.

The controller 10 includes a central processing unit (CPU) 11, a random access memory (RAM) 12, and a read only memory (ROM) 13.

The CPU 11 executes various types of processing, by executing a program for control, which is stored in the ROM 13.

The RAM 12 is configured by a volatile memory and is used as a work space for the CPU 11.

The ROM 13 is configured by a non-volatile memory such as a flash memory, and stores control programs executed by the CPU 11 and various types of fixed data. The fixed data includes simultaneous localization and mapping (SLAM) map information used by the controller 10 to perform processing to estimate the self-position, environment map information to be referred to in the autonomous movement, and the like.

The controller 10 executes processing to switch between the operation modes of the pet robot 1. The pet robot 1 operates by switching between the operation modes that include an autonomous movement mode and an autonomous movement stop mode. The pet robot 1 autonomously moves during the autonomous movement mode; and does not autonomously move during the autonomous movement stop mode.

The image acquirer 20 includes a camera, and outputs image information obtained by capturing the environment, to the controller 10. The controller 10 estimates the self-position, including the height from the floor surface 2, based on a plurality of pieces of image information obtained by the pet robot 1 while moving via the image acquirer 20 and the SLAM map, and by means of visual simultaneous localization and mapping (VSLAM). In other words, the image acquirer 20 detects, in collaboration with the controller 10, the height from the floor surface 2 serving as a reference surface, and thereby functions as a detector that detects a change in height.

The inertia measurer 30 includes a triaxial accelerometer or the like, and outputs, to the controller 10, information on acceleration in the three-axis direction, having been measured by the triaxial accelerometer. The inertia measurer 30 also includes a gyroscope sensor or the like, and outputs angular rate information to the controller 10. The controller 10 periodically obtains the acceleration information and the angular rate information, starting from the state provided on the floor surface 2. Then, the controller 10 understands the attitude of the pet robot 1, based on the accumulated angular rate information starting from the state provided on the floor surface 2, and extracts the component in the vertical direction, from the triaxial acceleration information having been obtained. In this way, the controller 10 calculates the acceleration in the vertical direction, based on the angular rate information and the acceleration information obtained from the inertia measurer 30.

Moreover, the controller 10 calculates the acceleration information in the vertical direction, for example in every ten milliseconds, and records the acceleration information in the vertical direction in the RAM 12 together with the time. Then, the controller 10 integrates the acceleration in the vertical direction thereby calculating the velocity in the vertical direction, and records the velocity in the vertical direction in the RAM 12 together with the time. Furthermore, the controller 10 integrates the velocity in the vertical direction having been calculated, to calculate the amount of fluctuation in the vertical direction, that is, the amount of fluctuation in height, and records the amount of fluctuation in height in the RAM 12 together with the time. In this way, the inertia measurer 30 detects, in collaboration with the controller 10, the amount of fluctuation in height, and functions as a detector that detects a change in height.

The distance measurer 40 includes a contact sensor, a distance sensor, or the like, and measures a distance between a bottom surface of the pet robot 1 (or a tip of the leg portion 70) and the floor surface, and outputs the measured distance information to the controller 10. The controller 10 determines whether a bottom portion of the pet robot 1 is in contact with any object, based on the obtained distance information. In this way, the distance measurer 40 detects, in collaboration with the controller 10, whether the bottom portion of the pet robot 1 is in contact with any object, and functions as a detector that detects a change in height.

The sound outputter 50 includes a digital/analog (D/A) conversion circuit, an amplifier, a speaker, and the like, and converts a sound signal output from the controller 10 into a sound, and outputs the sound.

The sound inputter 60 includes an analogue/digital (A/D) conversion circuit, a microphone, and the like, collects a voice uttered by a user and converts the voice into a sound signal, and outputs the sound signal to the controller 10. The controller 10 performs sound recognition processing on the sound signal input from the sound inputter 60, and determines the instruction. The ROM 13 stores, in advance, a list of instructions. The list of instructions is a list that indicates what instruction each phrase uttered by a user means. For example, the list of instructions indicates that the phrase "Wait." is an instruction to stop movement, and the like. When a user utters a voice "Wait.", for example, the controller 10 performs sound recognition processing on the sound signal input from the sound inputter 60, and by referring to the list of instructions, understands that the voice "Wait." is an instruction to stop movement.

The leg portion 70 includes four movable apparatuses and respective drivers, and supports the pet robot 1 by being in contact with the floor surface 2. The controller 10 drives the four movable apparatuses via the drivers, in the autonomous movement mode. In addition, the controller 10 stops the operation of the four movable apparatuses via the drivers, in the autonomous movement stop mode. In this way, the leg portion 70 functions as a movable apparatus that conducts autonomous movement in collaboration with the controller 10.

Next, the operation of the pet robot 1 is described. Upon starting operating, by a user operation or the like, the pet robot 1 first performs initializing processing. In the initializing processing, the controller 10 obtains an image from the image acquirer 20, estimates the self-position at that time by means of the VSLAM, and stores, in the RAM 12, the height included in the estimated self-position as the height of the floor surface 2. In other words, the floor surface 2 serves as a reference surface used when determining the height.

Next, the pet robot 1 starts operating in the autonomous movement mode. In the autonomous movement mode, the controller 10 instructs the leg portion 70 to operate, based on the self-position estimated by the VSLAM and the environment map information stored in the ROM 13. In other words, the controller 10 executes a movement step to perform an autonomous movement.

The environment map information is map information on the floor surface 2 divided into grid cells; and the environment map information represents whether or not the pet robot 1 was movable with respect to each cell, based on the distance information obtained by the distance measurer 40 and the like. The controller 10 updates the map information stored on the RAM 12, from time to time. Specifically, the controller 10 labels a cell with an obstacle, as "immovable," and a cell without any obstacle, as "movable," pursuant to the distance information obtained by the distance measurer 40 and the like. In planning the route for the pet robot 1 to move, the pet robot 1 determines an optimal route from among the routes on which the pet robot 1 is movable, by referring to the environment map information.

Upon switching to the autonomous movement mode, the controller 10 periodically and repeatedly executes autonomous movement stop mode switch processing to switch to an autonomous movement stop mode when necessary, until the mode is switched to a different mode.

Figure 3:
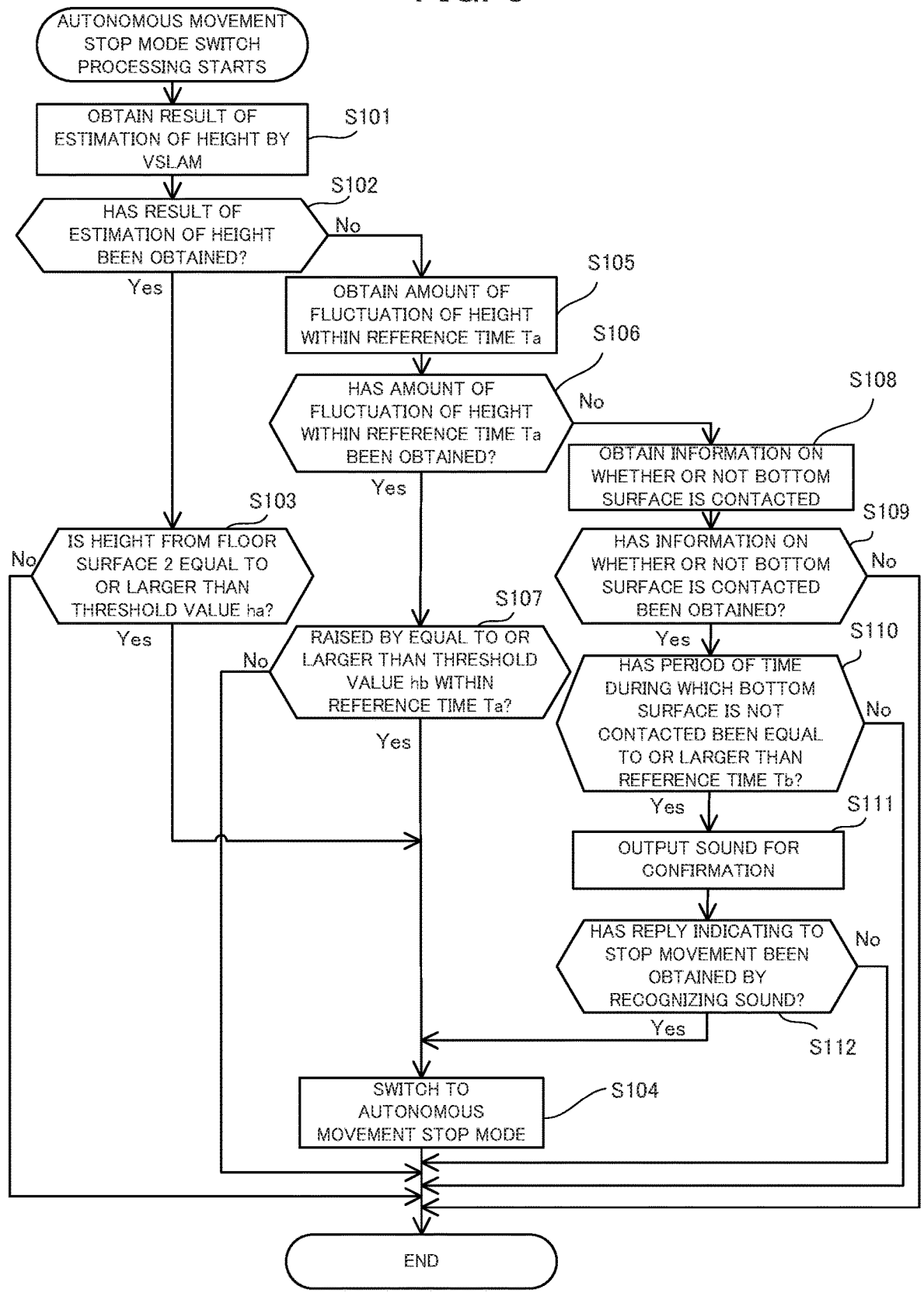
FIG. 3 is a flowchart of autonomous movement stop mode switch processing according to Embodiment 1 of the present disclosure.

As illustrated in FIG. 3, when the autonomous movement stop mode switch processing starts, the controller 10 obtains a result of estimation of the height from the floor surface 2 performed by the VSLAM, using the height of the floor surface 2 stored in the RAM 12, as a reference (Step S101). That is, Step S101 functions as a detection step to detect a change in height by detecting the height from the floor surface 2 serving as a reference surface.

Then, the controller 10 determines whether the result of estimation of the height has been obtained (Step S102). Because the controller 10 estimates the VSLAM's self-position based on the image obtained from the image acquirer 20, when no image can be obtained from the image acquirer 20 due to such reasons as the camera of the image acquirer 20 being covered by the user's clothes, estimation of the self-position by means of the VSLAM may become impossible. In view of the above, the controller 10 determines whether the result of estimation of the height has been obtained by means of the VSLAM.

When the controller 10 determines that the result of estimation of the height from the floor surface 2 has been obtained (Step S102: Yes), a determination is made as to whether the height from the floor surface 2 is equal to or larger than a threshold value ha (Step S103). If the height from the floor surface 2 is determined to be equal to or larger than the threshold value ha (Step S103: Yes), the controller 10 switches to the autonomous movement stop mode (Step S104), to end the autonomous movement stop mode switch processing. On the other hand, if the height from the floor surface 2 is determined to be not equal to or larger than the threshold value ha (Step S103: No), the controller 10 ends the autonomous movement stop mode switch processing as it is.

Here, the threshold value ha is a reference value to be determined and stored in the ROM 13 in advance. If the threshold value ha is too large, the objective of the disclosure, which is to reduce the possibility of the pet robot 1 colliding with another object and the possibility of the pet robot 1 falling off, cannot be achieved, because the mode does not switch to the autonomous movement stop mode even when the pet robot 1 is located in a high position. Conversely, if the threshold value ha is too small, the mode switches to the autonomous movement stop mode even when the pet robot 1 is still on the floor surface 2 depending on the concave or convex state or the gradient of the floor surface 2, thereby preventing the autonomous movement of the pet robot 1. In view of the above, the threshold value ha is defined to be "ha=30 cm" or the like, taking into consideration these trade-offs, and stored in advance in the ROM 13. The controller 10 obtains the threshold value ha from the ROM 13 and uses the threshold value ha in the determining processing in Step S103.

On the other hand, when determining that the result of estimation of the height has not been obtained (Step S102: No), the controller 10 obtains the amount of fluctuation of the height within the reference time Ta (Step S105). Specifically, the controller 10 totals the amounts of fluctuation during a time period between the immediate time and the reference time Ta before the immediate time, from among the amounts of fluctuation of the height continually recorded in the RAM 12, to obtain the amount of fluctuation of the height within the reference time Ta. In other words, Step S105 functions as a detection step to detect a change in height, by detecting the amount of fluctuation of the height.

Next, the controller 10 determines whether or not the amount of fluctuation of the height within the reference time Ta has been obtained (Step S106). When the pet robot 1 performs an active movement in the vertical direction that exceeds the range the inertia measurer 30 is able to measure, or performs such an active rotation action for which the movement in the vertical direction cannot be traced back, there may be cases in which no information representing the triaxial acceleration or information representing the vertical direction can be obtained from the inertia measurer 30. In view of the above, the controller 10 determines whether or not the amount of fluctuation of the height within the reference time Ta has been obtained.

When the amount of fluctuation of the height within the reference time Ta is determined to have been obtained (Step S106: Yes), the controller 10 determines whether or not the amount of fluctuation of the height within the reference time Ta having been obtained has increased by equal to or larger than the threshold value hb, that is, whether or not the pet robot 1 has been raised by equal to or larger than the threshold value hb within the reference time Ta (Step S107).

When the pet robot 1 is determined to have been raised by equal to or larger than the threshold value hb within the reference time Ta (Step S107: Yes), the controller 10 switches to the autonomous movement stop mode (Step S104), and ends the autonomous movement stop mode switch processing. On the other hand, if the pet robot 1 is determined not to have been raised by equal to or larger than the threshold value hb within the reference time Ta (Step S107: No), the controller 10 ends the autonomous movement stop mode switch processing as it is.

Here, the reference time Ta and the threshold value hb are reference values to be determined and stored in the ROM 13 in advance. If the reference time Ta is too short, the amount of fluctuation of the height will take a small value if the pet robot 1 is gradually raised up. Therefore, the mode will not switch to the autonomous movement stop mode, and the objective of the disclosure, which is to reduce the possibility of the pet robot 1 colliding with another object and the possibility of the pet robot 1 falling off, cannot be achieved. Conversely, if the reference time Ta is too long, either the timing for determining the amount of fluctuation of the height may become too late, or the accuracy in determination may be worsened due to the cumulative errors. Therefore, the reference time Ta is defined to be "Ta=three seconds," for example, taking into consideration these trade-offs, and stored in the ROM 13.

If the threshold value hb is too large, even when the pet robot 1 has moved in a high position, the mode does not switch to the autonomous movement stop mode, and the objective of the disclosure, which is to reduce the possibility of the pet robot 1 colliding with another object and the possibility of the pet robot 1 falling off, cannot be achieved. Conversely, if the threshold value hb is too small, the mode switches to the autonomous movement stop mode even when the pet robot 1 is still on the floor surface 2 depending on the concave or convex state or the gradient of the floor surface 2, thereby preventing the autonomous movement of the pet robot 1. In view of the above, the threshold value hb is defined to be "hb=20 cm" or the like, taking into consideration these trade-offs, and stored in advance in the ROM 13. The controller 10 obtains the reference time Ta and the threshold value hb from the ROM 13, and uses the reference time Ta and the threshold value hb in the determining processing in Step S107.

Furthermore, when determining that the amount of fluctuation of the height within the reference time Ta has not been obtained (Step S106: No), the controller 10 obtains information on whether or not the bottom surface is contacted, from the distance measurer 40 (Step S108). Then, the controller 10 determines whether or not the information on whether or not the bottom surface is contacted has been obtained (Step S109). When the information on whether or not the bottom surface is contacted is determined to have been obtained (Step S109: Yes), the controller 10 determines whether or not the period of time during which the bottom surface is not contacted is equal to or larger than the reference time Tb (Step S110).

When the period of time during which the bottom surface is not contacted is determined to have been equal to or larger than the reference time Tb (Step S110: Yes), the controller 10 sends an instruction signal to issue a sound for confirmation, to the sound outputter 50 (Step S111). The sound outputter 50 issues a sound for confirmation such as "bow-wow-wow" according to the instruction signal. The user has known that the sound for confirmation to confirm whether or not to move is "bow-wow-wow" from the description of the instruction handbook, or the like. Therefore, when hearing this sound for confirmation, and if determining that the pet robot 1 should not move, the user utters a voice for an instruction that can be recognized by the pet robot 1, such as "Wait." The controller 10 determines whether or not a reply indicating to stop movement is obtained via the sound inputter 60 (Step S112). If determining that a reply indicating to stop movement, such as "Wait." is obtained (Step S112: Yes), the controller 10 switches to the autonomous movement stop mode (Step S104), and ends the autonomous movement stop mode switch processing. On the other hand, if determining that no reply indicating to stop movement is obtained (Step S112: No), the controller 10 ends the autonomous movement stop mode switch processing as it is. In this way, in Step S111 and Step S112, the sound inputter 60 functions as a confirm apparatus to confirm with a user whether or not to switch between the operation modes, in collaboration with the sound outputter 50 and the controller 10.

When the period of time during which the bottom surface is not contacted is not equal to or larger than the reference time Tb (Step S110: No), the autonomous movement stop mode switch processing is ended as it is.

Here, the reference time Tb is a reference value to be determined and stored in advance in the ROM 13. If the reference time Tb is too short, a sound for confirmation is easily issued even when the pet robot 1 only instantaneously leaves the floor surface 2, which is not practical. Conversely, if the reference time Tb is too long, the timing for determination is too late, to be unable to switch to the autonomous movement stop mode, and the objective of the disclosure, which is to reduce the possibility of the pet robot 1 colliding with another object and the possibility of the pet robot 1 falling off, cannot be achieved. In view of the above, the reference time Tb is defined to be "Tb=three seconds" for example, taking into consideration these trade-offs, and stored in advance in the ROM 13. The controller 10 obtains the reference time Tb from the ROM 13 and uses the reference time Tb in the determining processing in Step S110.

If determining that the information on whether or not the bottom surface is contacted has not been obtained (Step S109: No), the controller 10 ends the autonomous movement stop mode switch processing as it is.

In this way, the controller 10 functions as a controller to switch the operation mode to the autonomous movement stop mode. When having switched to the autonomous movement stop mode, the controller 10 outputs, to the leg portion 70, an instruction to stop the autonomous movement. Accordingly, the leg portion 70 will stop the operation; however, the sound outputter 50, the sound inputter 60, and the other portions will not cease the operations.

Next, when having switched to the autonomous movement stop mode, the controller 10 periodically and repeatedly executes autonomous movement stop mode switch processing, including determination as to whether or not to switch to the autonomous movement mode, until the mode is switched to a different mode.

Figure 4:
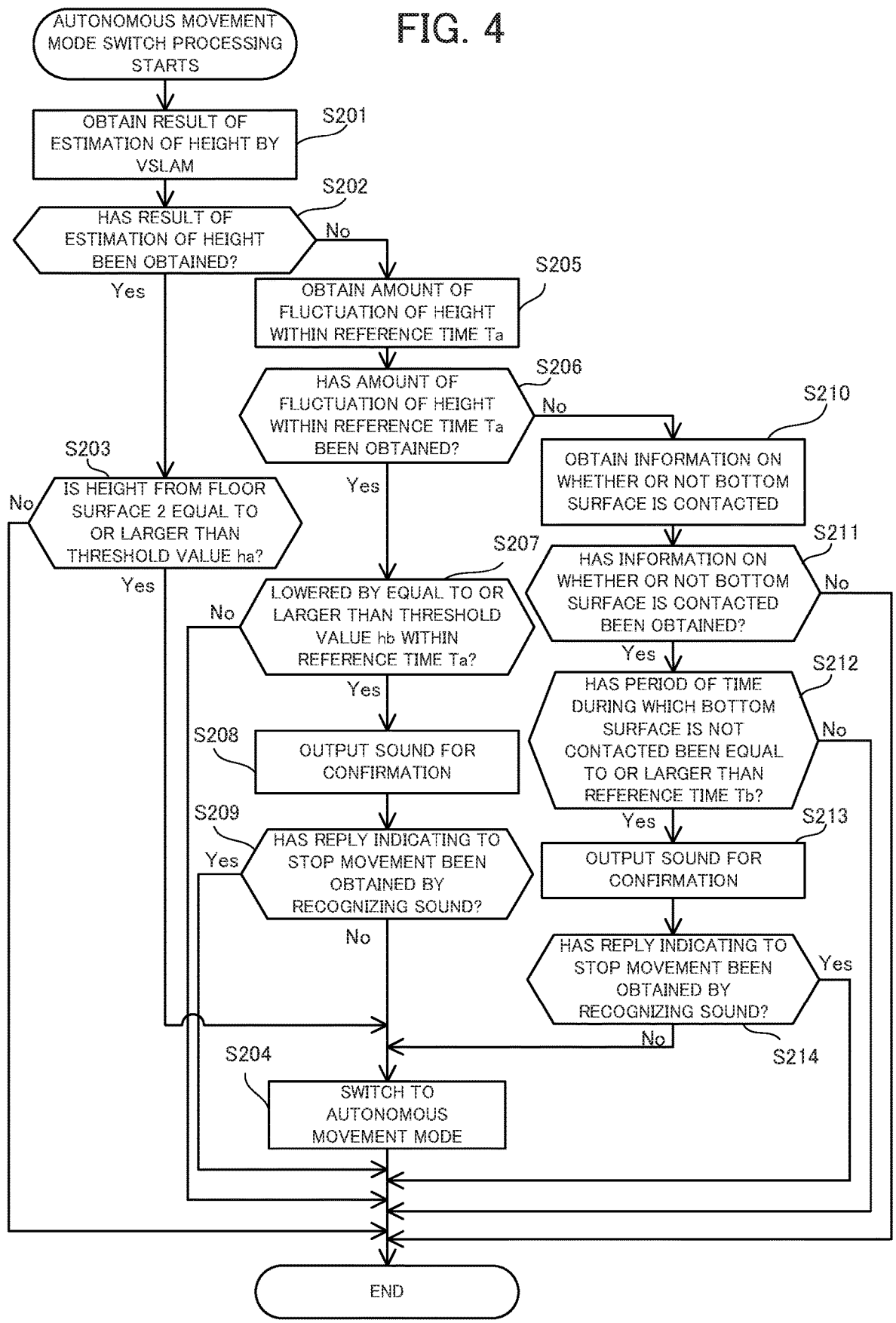
FIG. 4 is a flowchart of autonomous movement mode switch processing according to Embodiment 1 of the present disclosure.

As illustrated in FIG. 4, when the autonomous movement mode switch processing is started, the controller 10 obtains the result of estimation of the height from the floor surface 2 by means of the VSLAM, using, as a reference, the height of the floor surface 2 stored in the RAM 12 (Step S201). Then, the controller 10 determines whether or not the result of estimation of the height from the floor surface 2 has been obtained (Step S202).

When having determined that the result of estimation of the height from the floor surface 2 has been obtained (Step S202: Yes), the controller 10 determines whether or not the height from the floor surface 2 is equal to or smaller than the threshold value ha (Step S203). When having determined that the height from the floor surface 2 is equal to or smaller than the threshold value ha (Step S203: Yes), the controller 10 switches to the autonomous movement mode (Step S204), and ends the autonomous movement mode switch processing. On the contrary, if determining that the height from the floor surface 2 is not equal to or smaller than the threshold value ha (Step S203: No), the controller 10 ends the autonomous movement mode switch processing as it is.

When having determined that the result of estimation of the height has not been obtained (Step S202: No), the controller 10 obtains the amount of fluctuation of the height within the reference time Ta (Step S205).

Next, the controller 10 determines whether or not the amount of fluctuation of the height within the reference time Ta has been obtained (Step S206). If determining that the amount of fluctuation of the height within the reference time Ta has been obtained (Step S206: Yes), the controller 10 determines whether or not the amount of fluctuation of the height within the reference time Ta having been obtained has decreased by equal to or larger than the threshold value hb, that is, whether or not the pet robot 1 has been lowered by equal to or larger than the threshold value hb within the reference time Ta (Step S207).

Next, if the controller 10 determines that the pet robot 1 has been lowered by equal to or larger than the threshold value hb within the reference time Ta (Step S207: Yes), the controller 10 sends an instruction signal to issue a sound for confirmation, to the sound outputter 50 (Step S208). The sound outputter 50 issues a sound for confirmation such as "bow-wow-wow" according to the instruction signal. When hearing this sound for confirmation, and if determining that the pet robot 1 should not move, the user utters a voice for an instruction that can be recognized by the pet robot 1, such as "Wait." The controller 10 determines whether or not a reply indicating to stop movement has been obtained via the sound inputter 60 (Step S209). For example, if determining that no reply indicating to stop movement, such as "Wait." has been obtained (Step S209: No), the controller 10 switches to the autonomous movement mode (Step S204), and ends the autonomous movement mode switch processing. On the contrary, when determining that a reply indicating to stop movement has been obtained (Step S209: Yes), the controller 10 ends the autonomous movement mode switch processing as it is.

On the other hand, if determining that the pet robot 1 has not been lowered by equal to or larger than the threshold value hb within the reference time Ta (Step S207: No), the controller 10 ends the autonomous movement mode switch processing as it is.

Furthermore, if determining that no amount of fluctuation of the height within the reference time Ta has been determined (Step S206: No), the controller 10 obtains, from the distance measurer 40, information on whether or not the bottom surface is contacted (Step S210). Then, the controller 10 determines whether information on whether or not the bottom surface is contacted has been obtained (Step S211). If determining that information on whether or not the bottom surface is contacted has been obtained (Step S211: Yes), the controller 10 determines whether or not the period of time during which the bottom surface is not contacted has been equal to or larger than a reference time Tb (Step S212).

If determining that the period of time during which the bottom surface is not contacted has been equal to or larger than the reference time Tb (Step S212: Yes), the controller 10 sends an instruction signal to issue a sound for confirmation, to the sound outputter 50 (Step S213). The sound outputter 50 issues a sound for confirmation such as "bow-wow-wow" according to the instruction signal. When hearing this sound for confirmation, and if determining that the pet robot 1 should not move, the user utters a voice for an instruction that can be recognized by the pet robot 1, such as "Wait." The controller 10 determines whether or not a reply indicating to stop movement is obtained via the sound inputter 60 (Step S214). For example, if determining that no reply indicating to stop movement, such as "Wait." is obtained (Step S214: No), the controller 10 switches to the autonomous movement mode (Step S204), and ends the autonomous movement mode switch processing. On the other hand, if determining that a reply indicating to stop movement is obtained (Step S214: Yes), the controller 10 ends the autonomous movement mode switch processing as it is.

If determining that the period of time during which the bottom surface is not contacted has not been equal to or larger than the reference time Tb (Step S212: No), the controller 10 ends the autonomous movement mode switch processing as it is.

If determining that no information on whether or not the bottom surface is contacted has been obtained (Step S211: No), the controller 10 ends the autonomous movement mode switch processing as it is.

In this way, the controller 10 functions as a controller to switch the operation mode to the autonomous movement mode. When having switched to the autonomous movement mode, the controller 10 outputs an instruction to perform autonomous movement, to the leg portion 70. The leg portion 70 operates accordingly.

As described above, the pet robot 1 according to the present embodiment has two operation modes, namely, the autonomous movement mode (the first operation mode) and the autonomous movement stop mode (the second operation mode). Accordingly, the pet robot 1 according to the present embodiment operates in the autonomous movement mode on the floor surface 2, and operates in the autonomous movement stop mode in a high place. According to this, the autonomous movement is conducted on the floor surface 2, while the autonomous movement is not conducted on a place higher than the floor surface 2, such as on a table. As a result, the pet robot 1 can be said to have a smaller possibility of colliding with another object and a smaller possibility of falling off, on such a high place such as on a table.

The pet robot 1 according to the present embodiment can automatically resume the autonomous movement when returning on the floor surface 2, by executing the autonomous movement mode switch processing. This makes the pet robot 1 a more practical robot.

When being able to accurately measure the height using the VSLAM, the pet robot 1 according to the present embodiment can automatically stop and cancel the autonomous movement, without experiencing the user confirmation process. Accordingly, the pet robot 1 can stop the autonomous movement without requiring any user operations.

Furthermore, the pet robot 1 according to the present embodiment obtains the amount of fluctuation of the height, from the measurement result of the inertia measurer 30, and uses the amount of fluctuation of the height in the determination. Accordingly, if the VSLAM cannot be used due to a small number of feature points, or if the image acquirer 20 cannot capture an image of the environment because of being held by a user in the user's arms, for example, the pet robot 1 can automatically stop or cancel the autonomous movement.

However, if for example the pet robot 1 has returned onto the floor surface 2 from the table, because the height from the table is not maintained, it is impossible to know whether or not the pet robot 1 has actually returned on the floor surface 2, only from the amount of fluctuation of the height. In view of the above, the pet robot 1 according to the present embodiment goes through the user confirmation process in Step S208 of FIG. 4, to prevent inadequate switching to the autonomous movement mode.

In addition, the pet robot 1 according to the present embodiment detects whether or not the pet robot 1 is on the floor surface 2 from the measurement result of the distance measurer 40, and uses, in the determination, the information on whether or not the pet robot 1 is on the floor surface 2. By doing so, even when the pet robot 1 performs an active movement and the measurement result of the inertia measurer 30 cannot be used, for example, it is still possible to stop or cancel the autonomous movement.

However, it is not possible to know exactly whether or not the pet robot 1 is on the floor surface 2, only from the measurement result of the distance measurer 40. In view of the above, the pet robot 1 according to the present embodiment goes through the user confirmation process in Step S111 of FIG. 3 and Step S213 of FIG. 4, to prevent inadequate switching to the autonomous movement mode or to the autonomous movement stop mode.

Although the pet robot 1 according to the present embodiment performs user confirmation in Step S111 of FIG. 3, and Step S208 and Step S213 of FIG. 4, the scope of the present disclosure is not limited to this. For example, it is also possible to make it a rule to always perform the user confirmation before switching to the autonomous movement stop mode and the autonomous movement mode. In that case, it is easier to prevent erroneous operations because no automatic switch to the autonomous movement mode or the autonomous movement stop mode is performed unless a user confirmation is performed. It is alternatively possible to make it a rule to always perform the user confirmation before switching to the autonomous movement mode, but not to perform user confirmation at all before switching to the autonomous movement stop mode. In that case, while switch to the autonomous movement stop mode is automatic, switch to the autonomous movement mode always requires user confirmation, which is safer.

The pet robot 1 according to the present embodiment does not perform any autonomous movement in the autonomous movement stop mode; however, the scope of the present disclosure is not limited to this. For example, some movement may be allowed in the autonomous movement stop mode. For example, a movement to the level of stepping may be allowed. In addition, if there is a driver to change the attitude, the operation of that driver may be allowed. Alternatively, such arrangement is possible in which, if within 30 cm range from the center of the pet robot 1, the pet robot may be allowed to move; and if exceeding that range, none of the movement by the leg portion 70 or the movement to change the attitude is allowed. In the present specification, "to stop the autonomous movement", not just limited to refraining from any autonomous movement, but also includes allowing a little movement or attitude change as long as fulfilling the objective of the present disclosure. In this way, by allowing a little movement during the autonomous movement stop mode, the safety can be secured without impairing the impression from use of the pet robot 1.

The leg portion 70 of the pet robot 1 according to the present embodiment includes four movable apparatuses; however, the scope of the present disclosure is not limited to this. As long as capable of functioning as a movable apparatus of the pet robot 1, the leg portion 70 is not limited to a particular form or driving method. For example, the leg portion 70 may include wheels, caterpillars, or the like, instead of four movable apparatuses.

The pet robot 1 according to the present embodiment determines whether or not there is a reply indicating to stop movement from the user, such as "Wait.", in the user confirmation process; however, the scope of the present disclosure is not limited to this. For example, it is possible to determine based on whether or not there is a reply to the effect not to stop movement, such as "Move on." In this alternative, it is possible to stop movement, even when there is no reply or the pet robot 1 cannot understand that reply, which helps secure more safety. In one exemplary user confirmation method, a button, a touch sensor, or the like is provided for the pet robot 1, and by a user operating such button, touch sensor, or the like, an instruction to stop movement or not to stop movement is issued. An operation on a button, a touch sensor, or the like can be less ambiguous than in the case of oral reply.

The pet robot 1 according to the present embodiment uses the VSLAM based on the image obtained from the image acquirer 20, as means to measure the height; however, the scope of the present disclosure is not limited to this. For example, the height may be measured by observing through an external camera, or by observing an external marker, the coordinates of which are known. The above methods allow more accurate measurement of the height of the pet robot 1. Note that, if observing through an external camera, the pet robot 1 may include a receiver, to receive information representing the height through the external camera.

The pet robot 1 according to the present embodiment uses an inertia measurer 30, as means to detect the amount of fluctuation of the height; however, the scope of the present disclosure is not limited to this. For example, a barometer may be used to detect the amount of fluctuation of the height. Even in the same room, the atmospheric pressure changes according to the environments such as climate. Therefore, the amount of fluctuation of the height may be estimated depending on the result of calculation of the differences in atmospheric pressures measured by the controller 10 a plural number of times. Therefore, instead of the acceleration in the vertical direction measured by the inertia measurer 30, the atmospheric pressure measured by the barometer at every ten milliseconds can be used, for example. If a highly accurate barometer is used, the amount of fluctuation of the height can be detected at the accuracy of about 20 cm.

The pet robot 1 according to the present embodiment uses the distance measurer 40, as means to detect whether or not the pet robot 1 is on the floor surface 2; however, the scope of the present disclosure is not limited to this. For example, by allowing the controller 10 to analyze the image obtained from the image acquirer 20, and to recognize a user's face, it is possible to arrange so that the pet robot 1 is determined to be likely in a high place, if a user's face is detected in the horizontal direction. Alternatively, it is possible to arrange so that the controller 10 can use, in the determination, the acceleration in the vertical direction obtained from the inertia measurer 30 as it is, thereby determining that the possibility of the height being changed is high. Still alternatively, these measurement methods can be adopted in combination. By adopting a plurality of measurement methods to estimate whether or not the pet robot 1 is on the floor surface 2, a safer pet robot can be provided.

The pet robot 1 according to the present embodiment uses, as a reference, one threshold value in processing to determine whether or not to switch between the autonomous movement mode and the autonomous movement stop mode with use of the amount of fluctuation of the height; however, the scope of the present disclosure is not limited to this. For example, by setting two threshold values, the smaller threshold value is set as a first threshold value, and the larger threshold value is set as a second threshold value. Then, it is possible to arrange so that: if the amount of fluctuation of the height exceeds the first threshold value, the user will be confirmed whether or not to switch between the autonomous movement mode and the autonomous movement stop mode; and if the amount of fluctuation of the height exceeds the second threshold value, automatic switch between the autonomous movement mode and the autonomous movement stop mode is performed.

Figure 6:
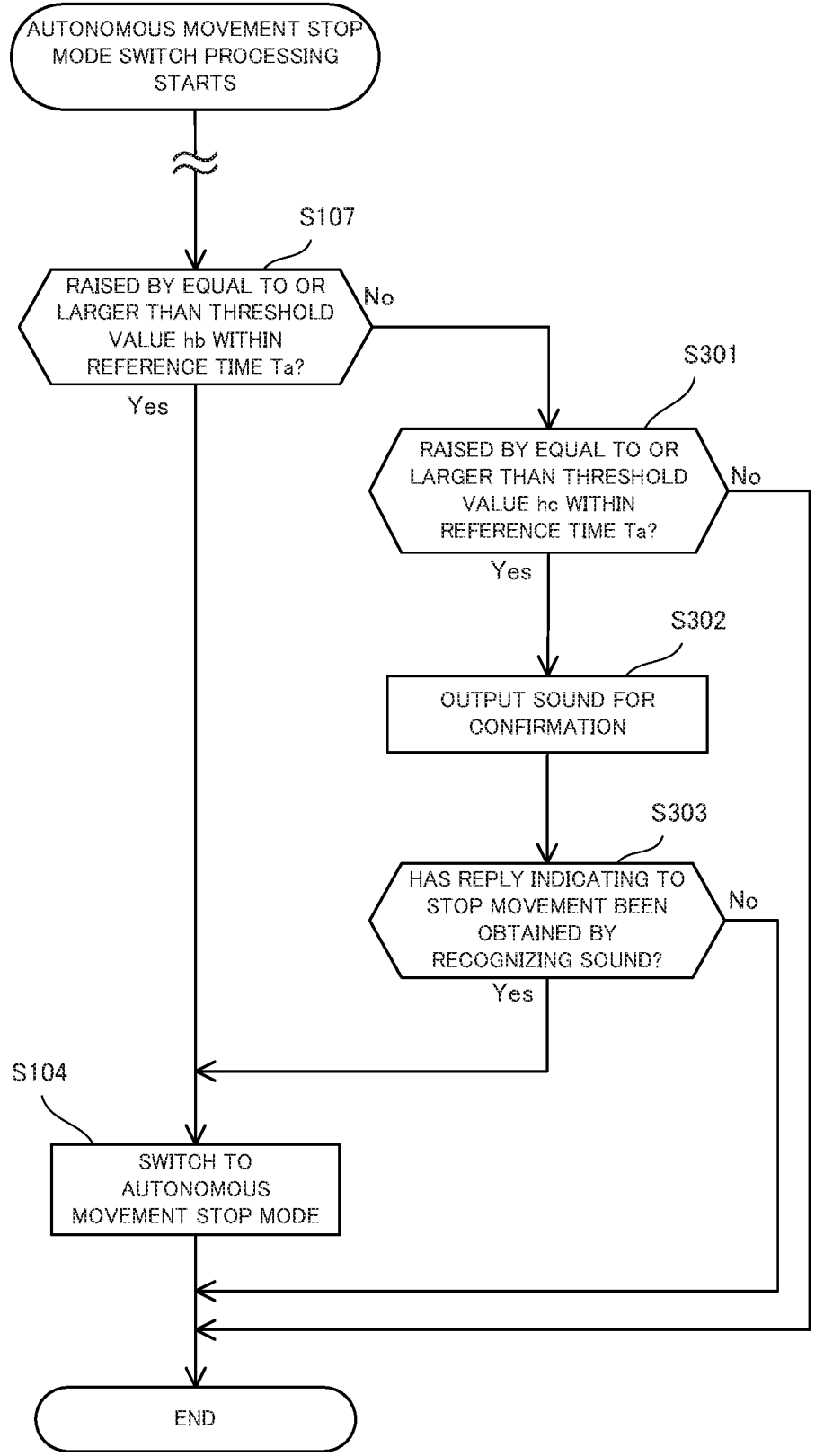
FIG. 6 is an abstract of a flowchart of autonomous movement stop mode switch processing according to a modification example of Embodiment 1 of the present disclosure.

With reference to FIG. 6, the above arrangement is specifically explained. If the controller 10 determines that the pet robot 1 is not raised by equal to or larger than the threshold value hb within the reference time Ta, in Step S107 in the autonomous movement stop mode switch processing (Step S107: No), then, it is determined whether or not the pet robot 1 is raised by equal to or larger than the threshold value hc within the reference time Ta (Step S301). Here, the threshold value hc is a reference value smaller than the threshold value hb, and is determined and stored in the ROM 13 in advance. That is, the first threshold value is the threshold value hc, and the second threshold value is the threshold value hb. If determining that the pet robot 1 has been raised by equal to or larger than the threshold value hc within the reference time Ta (Step S301: Yes), the controller 10 transmits, to the sound outputter 50, an instruction signal to issue a sound for confirmation (Step S302). The sound outputter 50 issues a sound for confirmation, such as "bow-wow-wow" according to an instruction signal. Hearing this sound for confirmation, if the user determines that the pet robot 1 should not move, the user utters a voice for an instruction that can be recognized by the pet robot 1, such as "Wait." The controller 10 determines whether or not a reply indicating to stop movement has been obtained, via the sound inputter 60 (Step S303). When having determined that a reply indicating to stop movement, such as "Wait." has been obtained (Step S303: Yes), the controller 10 switches to the autonomous movement stop mode (Step S104), then ends the autonomous movement stop mode switch processing. On the other hand, if determining that no reply indicating to stop movement has been obtained (Step S303: No), the controller 10 ends the autonomous movement stop mode switch processing as it is.

Use of the amount of fluctuation of the height may, in some cases, cause inaccurate recognition of the height due to such effects as cumulative errors. The user confirmation process can thus prevent an erroneous operation of the pet robot 1. In addition, where necessary, also in the processing to determine whether or not to switch between the autonomous movement mode and the autonomous movement stop mode using the height, a configuration may be adopted in which two threshold values are used instead of a single threshold value.

The pet robot 1 according to the present embodiment uses the same threshold value, for the threshold value to be used in the autonomous movement stop mode switch processing and for the threshold value to be used in the autonomous movement mode switch processing; however, different threshold values may be adopted therebetween. For example, the threshold value used in Step S203 may be set as a threshold value hd, which is slightly smaller than the threshold value ha used in Step S103. Accordingly, when the height of the pet robot 1 is around ha, by switching back and forth the autonomous movement mode and the autonomous movement stop mode, instable operation can be prevented. Likewise, the threshold value used in Step S207 is set to a threshold value he, which is slightly smaller than the threshold value hb used in Step S107. By doing so, when the controller 10 determines with reference to the amount of fluctuation of the height, such status as not unable to return to the autonomous movement mode due to measurement errors can be prevented.

Embodiment 2

In Embodiment 1, an example is illustrated in which the autonomous mobile apparatus according to the present disclosure is applied to the pet robot 1 for which the environment map information is not updated. In the case of the autonomous mobile apparatus in which the environment map information is updated, if the environment map information is updated in a high place, the update may be performed in erroneous content in some cases, to prevent normal operation when having returned on the floor surface 2. In view of the above, the following describes, with reference to the drawings, embodiments for either stopping the pet robot 3 that updates the environment map information from updating the environment map information in a high place, or applying an autonomous mobile apparatus that deletes the environment map information. In the present embodiment, the differences from the Embodiment 1 are mainly described.

Figure 5:
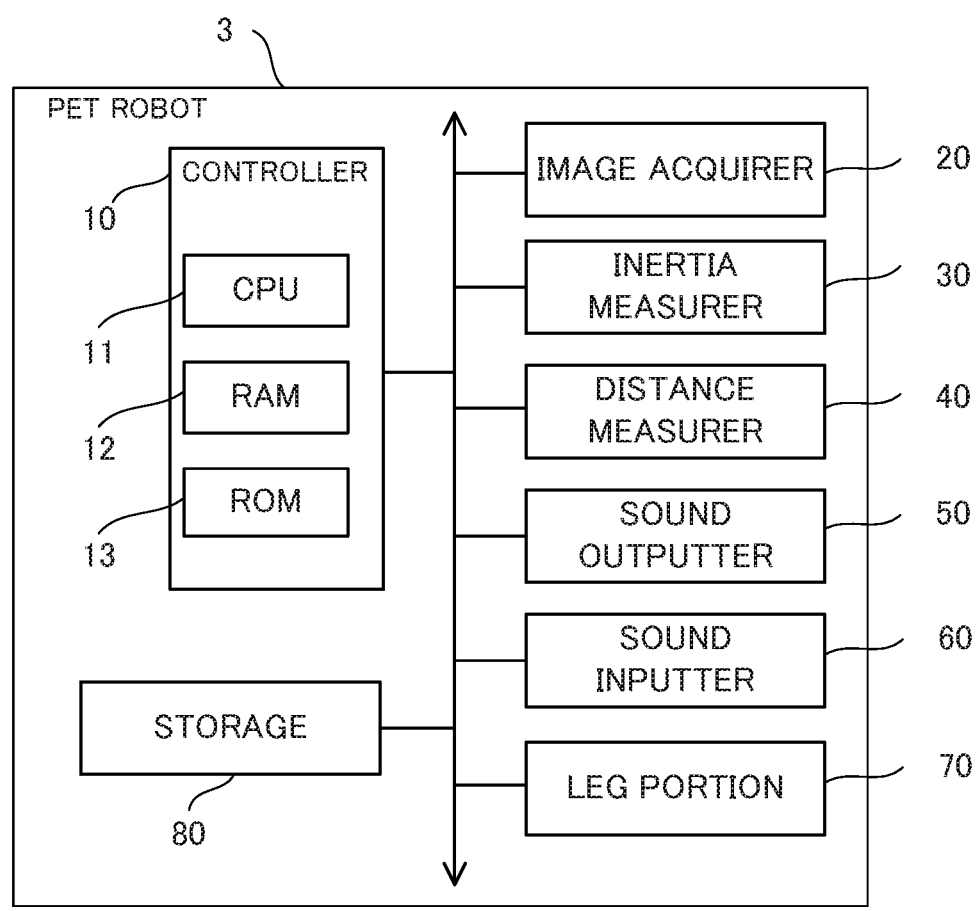
FIG. 5 is a configuration diagram of a pet robot according to Embodiment 2 of the present disclosure.

The pet robot 3 according to the present embodiment further includes a storage 80 as illustrated in FIG. 5. The storage 80 includes a non-volatile memory that comprises a flash memory, a magnetic storage, an optical disk drive, or the like. The storage 80 retains environment map information to be referred to when the pet robot 3 performs autonomous movement.

When the pet robot 3 starts operating, the controller 10 regularly performs processing to update the environment map information stored in the storage 80, based on the image information obtained from the image acquirer 20. As illustrated in FIG. 7, upon start of an environment map creation processing, the controller 10 obtains a measurement result from the distance measurer 40 (Step S11).

Then, the controller 10 increments the free region counter of a region corresponding to the self-position estimated by the VSLAM and of the region corresponding to a region between the self-position and a position of the obstacle (Step S12). Here, the free region counter is explained with reference to the drawings.

The controller 10 generates an obstacle region grid as illustrated in FIG. 8A, and a free region grid as illustrated in FIG. 8B, in the environment map creation processing, and retains the obstacle region grid and the free region grid, in the RAM 12. They are created by dividing, into grids, each region of the environment map representing a reduced real space, and one counter value is stored in each one grid. The counter value of an obstacle region grid is referred to as "obstacle region counter," and the counter value of a free region grid is referred to as "free region counter." All of these counter values are initially set to 0. As larger the value of the obstacle region counter, the corresponding position in the grid has a larger possibility of having an obstacle. Furthermore, as larger the value of the free region counter, the corresponding position in the grid is a free region, which means that there is a smaller possibility of having an obstacle. Note that the obstacle region grid and the free region grid comprise a same size and the same number of grids; and the grids in the same position correspond to the region in the same real space.

Returning to FIG. 7, following Step S12, the controller 10 increments an obstacle region counter for the region in the position of the obstacle (Step S13).

Next, the controller 10 reads the obstacle region grid and the free region grid stored in the RAM 12, compares the counter values of respective grids in the same position, and creates environment map information setting the region satisfying "free region counter is smaller than obstacle region counter" as an obstacle (Step S14). For example, from the obstacle grid in FIG. 8A and the free region grid in FIG. 8B, the environment map in the FIG. 8C is created. Each grid in the environment map stores a value of zero and one, and zero represents a region on which it is possible to move freely (without any obstacle), and one represents a region on which it is not possible to move freely (having an obstacle). This is the end of the environment map creation processing performed by the controller 10.

The controller 10 regularly (for example, every ten seconds) reads, from the RAM 12, the environment map information for update, having been created in the environment map creation processing, and performs the update reflecting the environment map information stored in the storage 80. In this manner, the controller 10 functions as an environment map information updater to update the environment map information. In this manner, the environment map creation processing from Step S11 to Step S14 and the reflection processing onto the environment map information stored in the storage 80 functions as an environment map information updating step to update the environment map information.

The controller 10 of the pet robot 3 according to the present embodiment also operates by switching between the autonomous movement mode and the autonomous movement stop mode, just as the pet robot 1 in Embodiment 1. Furthermore, the controller 10 stops the update of the environment map information in the autonomous movement stop mode. The controller 10, when having switched to the autonomous movement stop mode, deletes the environment map information for update retained in the RAM 12, in the reflection processing onto the initial environment map information. Then, in the autonomous movement stop mode, the controller 10 stops updating the environment map information, by skipping the environment map information creation processing and regular reflection processing of the environment map information.

On the other hand, once being switched to the autonomous movement mode, the controller 10 resumes updating the environment map information. In the autonomous movement mode, the controller 10 resumes updating the environment map information, by executing the environment map information creation processing and regular reflection processing onto the environment map information.

In addition, when being switched to the autonomous movement stop mode, the controller 10, either instead of stopping updating the environment map information, or in addition to stopping updating the environment map information in the autonomous movement stop mode, may delete the environment map information stored in the storage 80. Furthermore, when being switched to the autonomous movement mode, the controller 10, either instead of resuming updating the environment map information, or in addition to resuming updating the environment map information, may delete the environment map information stored in the storage 80.

In this manner, the pet robot 3 according to the present embodiment stops the autonomous movement and stops updating the environment map information, in a high place. By doing so, even when the environment in a high place is different from the environment on the floor surface 2, the environment map information is avoided from being updated in content different from the content of the environment on the floor surface 2. Alternatively, when moving to a high place or returning from a high place, the pet robot 3 according to the present embodiment stops the autonomous movement, and deletes the environment map information. As a result, even when the environment in a high place is different from the environment on the floor surface 2, any environment map information which has a possibility of including erroneous content is deleted, and adequate environment map information can be created from a scratch.

The pet robot 3 according to the present embodiment stops updating the environment map information in the autonomous movement stop mode; however, the scope of the present disclosure is not limited to this. For example, the pet robot 3 may further contain two operation modes: the environment map information update mode (the first operation mode); and the environment map information update stop mode (the second operation mode). In this case, in the environment map information update mode, the pet robot 3 updates the environment map information, and stops updating the environment map information in the environment map information update stop mode. Alternatively, the pet robot 3 deletes the environment map information both when switching to the environment map information update mode and when switching to the environment map information update stop mode. It is alternatively possible to use a threshold value that is different from the threshold value used in determining whether or not to switch to the autonomous movement stop mode, in determining whether or not to switch between the environment map information update mode and the environment map information update stop mode.

Figure 9:
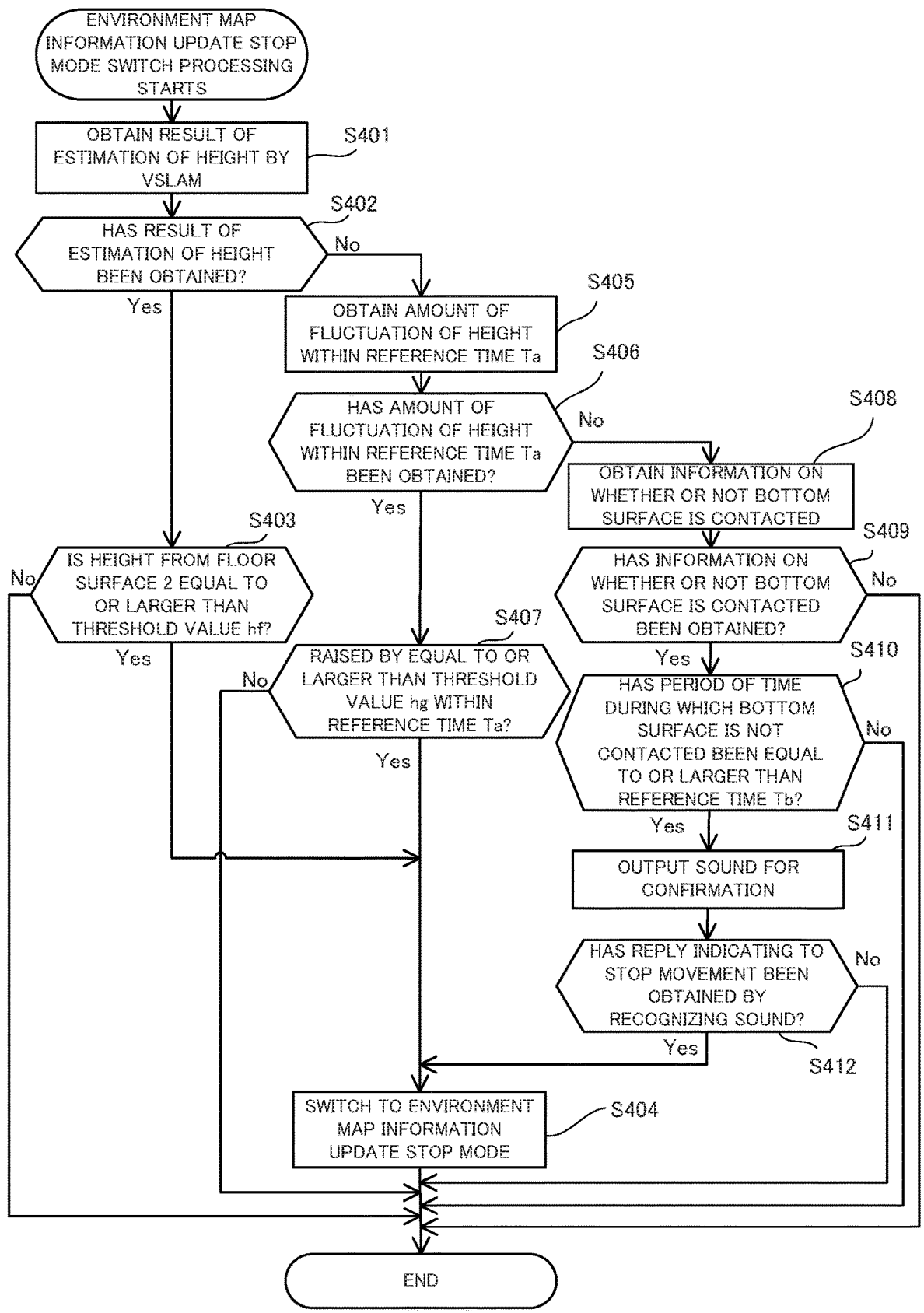
FIG. 9 is a flowchart of environment map information update stop mode switch processing according to Embodiment 2 of the present disclosure.
Figure 10:
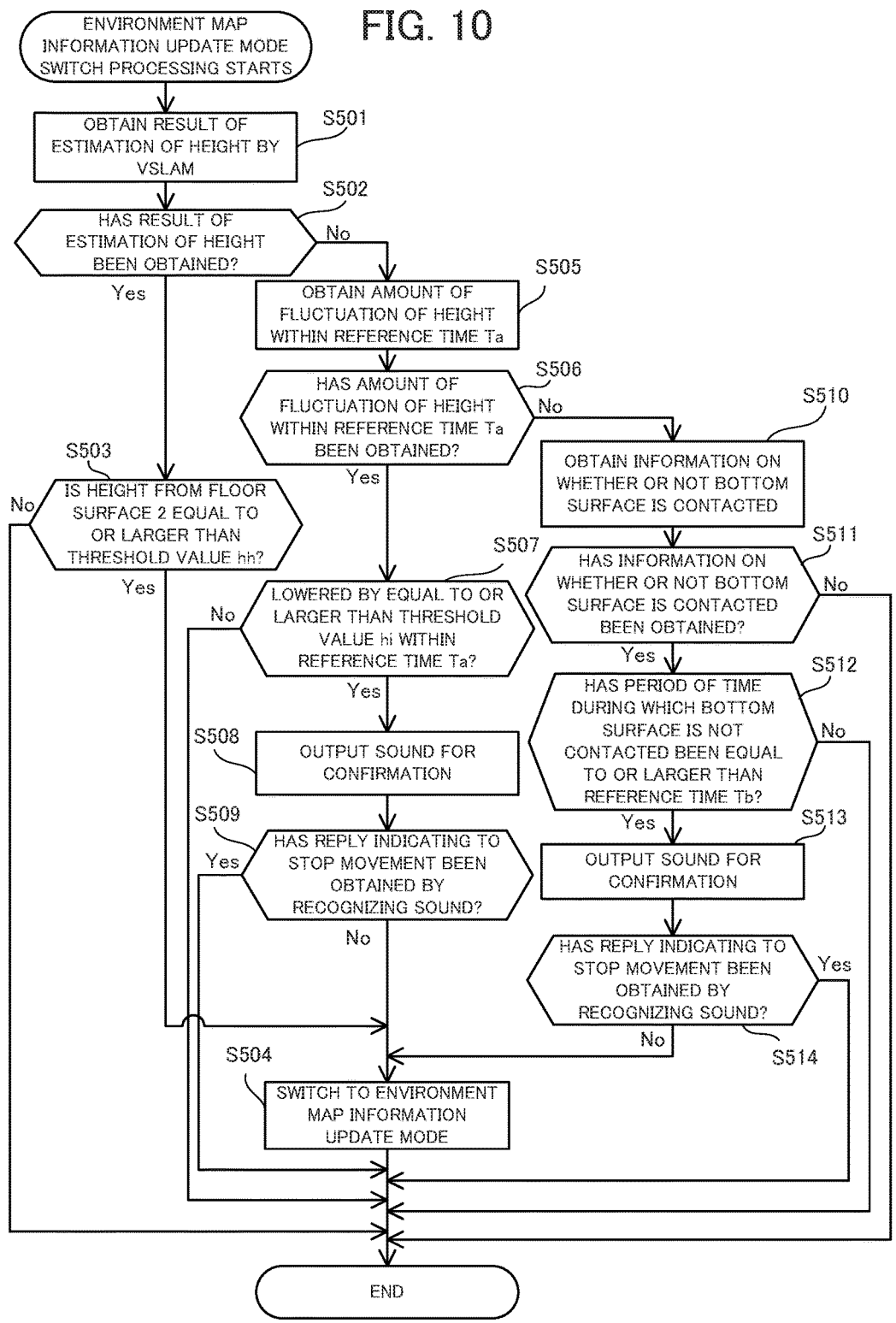
FIG. 10 is a flowchart of environment map information update mode switch processing according to Embodiment 2 of the present disclosure.

Specifically, the controller 10 executes the environment map information update stop mode switch processing as illustrated in FIG. 9 and the environment map information update mode switch processing as illustrated in FIG. 10. Each processing content is almost the same as the autonomous movement stop mode switch processing and the autonomous movement mode switch processing, and therefore the explanation thereof is omitted. The only difference is that the threshold value hf in Step S403, the threshold value hg in Step S407, the threshold value hh in Step S503, and the threshold value hi in Step S507 are respectively the threshold values different from the threshold value ha in Step S103, the threshold value hb in Step S107, the threshold value ha in Step S203 (alternatively, the threshold value hd), and the threshold value hb in Step S207 (alternatively, the threshold value he). In this way, by determining whether or not to stop the autonomous movement and whether or not to update the environment map information based on different threshold values from each other, adequate threshold values for respective pieces of processing can be set.

Furthermore, even though the pet robot 3 according to the present embodiment stores the environment map information inside; the environment map information may be maintained in an external apparatus such as a server. In that case, the pet robot 3 has a function of transmitting and receiving information to and from the external apparatus, and by communicating with the external apparatus maintaining the environment map information, updates and refers to the environment map information. In this manner, by maintaining the environment map information in an external apparatus, the pet robot 3 does not necessarily include the storage 80, and can reduce the weight of the pet robot 3.

The pet robot 3 according to the present embodiment uses the measurement result of the distance measurer 40 in creation of the environment map information. However, this is a mere example, and the scope of the present disclosure is not limited to this. For example, the controller 10 may analyze the image obtained from the image acquirer 20, determine the position of the obstacle, and create the environment map information. When the leg portion 70 includes a wheel, the pet robot 3 may include an odometry or the like not illustrated in the drawings, instead of the self-position estimation by means of the VSLAM, to allow the controller 10 to analyze the measurement result to estimate the self-position.

In the above-described embodiments, the autonomous mobile apparatus according to the present disclosure is applied to a pet robot; however, the autonomous mobile apparatus according to the present disclosure may be applied to a robot for other applications such as for industrial use and cleaning purposes, not limited to a pet. In addition, the autonomous mobile apparatus according to the present disclosure may alternatively be applied to an automobile, a toy, or the like, not limited to a robot.

The hardware configuration, the software configuration, or the like described above are examples to facilitate understanding of the embodiment of the disclosure, and are not to limit the disclosure.

Note that the pet robot may be realized by using an ordinary computer, not by way of a dedicated system. For example, a pet robot executing the above processing can be constituted by installing a program for causing a computer to execute any of the above, from a recording medium or the like storing therein the program, to the computer.

Any method may be used to supply the program to the computer. For example, the program may be supplied to the computer via a communication circuit, a communication network, a communication system, or the like.

In addition, when an operating system (OS) provides a part of the above functions, the program may provide a portion other than the functions provided by the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous mobile apparatus comprising:
a processor configured to;
refer to environment map information of an environment that was previously generated;
control the autonomous mobile apparatus to autonomously move to a portion of the environment; detect a change in height of the portion of the environment relative to a reference height;
determine whether the change in height is equal to or larger than a reference threshold; and
in response to detecting that the change in height is equal to or larger than the reference threshold, stop updating the environment map information with respect to the height of the portion of the environment or delete the environment map information that has been updated with respect to the height of the portion of the environment.

2. The autonomous mobile apparatus according to claim 1, having an operation mode that includes a first operation mode and a second operation mode,
wherein the processor is further configured to:
detect a height from a reference surface, and
determine whether the detected height from the reference surface is equal to or larger than a reference value;
switch the operation mode from the first operation mode to the second operation mode in response to determining that the detected height from the reference surface is equal to or larger than the reference value; and
switch the operation mode from the second operation mode to the first operation mode in response to determining that the detected height from the reference surface smaller than the reference value,
wherein when the operation mode is switched to the second operation mode, the processor is further configured to stop updating the environment map information or to delete the environment map information, and when the operation mode is switched to the first operation mode, the processor is further configured to resume updating the environment map information.

3. The autonomous mobile apparatus according to claim 1, having an operation mode that includes a first operation mode and a second operation mode,
wherein the processor is further configured to:
detect an amount of fluctuation of a height;
determine whether the amount of fluctuation of the height is an amount indicating an increase equal to or larger than a reference value within a reference time;
switch the operation mode from the first operation mode to the second operation mode in response to determining the amount of fluctuation of the height is the amount indicating the increase equal to or larger than the reference value within the reference time; and
switch the operation mode from the second operation mode to the first operation mode in response to determining the amount of fluctuation of the height is an amount indicating a decrease equal to or larger than the reference value within the reference time, and
wherein when the operation mode is switched to the second operation mode, the processor is further configured to stop updating the environment map information or to delete the environment map information, and when the operation mode is switched to the first operation mode, the processor is further configured to resume updating the environment map information.

4. The autonomous mobile apparatus according to claim 2,
wherein the processor is further configured to:
detect whether a bottom portion of the autonomous mobile apparatus is in contact with an object;
when the operation mode is the first operation mode, in response to detecting that the bottom portion is not in contact with the object, switch the operation mode to the second operation mode; and
when the operation mode is the second operation mode, in response to detecting and that the bottom portion is not in contact with the object, switch the operation mode to the first operation mode.

5. The autonomous mobile apparatus according to claim 3,
wherein the processor is further configured to:
confirm with a user whether or not to switch the operation mode; and
before switching the operation mode, obtain a confirmation result on whether or not to switch the operation mode, and switch the operation mode in accordance with the obtained confirmation result.

6. The autonomous mobile apparatus according to claim 1, further comprising:
a movable apparatus configured to perform an autonomous movement,
wherein the processor is further configured to:
determine whether an amount of fluctuation of the height is an amount indicating an increase equal to or larger than a reference value within a reference time; and
in response to determining that the amount of fluctuation of the height is the amount indicating the increase equal to or larger than the reference value within the reference time, stop the autonomous movement by the movable apparatus.

7. The autonomous mobile apparatus according to claim 6, having an operation mode including a first operation mode and a second operation mode,
wherein the processor is configured to:
switch the operation mode from the first operation mode to the second operation mode in response to determining that the amount of fluctuation of the height is the amount indicating the increase equal to or larger than the reference value within the reference time; and
switch the operation mode from the second operation mode to the first operation mode in response to determining that the amount of fluctuation of the height is an amount indicating a decrease equal to or larger than the reference value within the reference time,
wherein when the operation mode is switched to the second operation mode, the movable apparatus stops the autonomous movement, and when the operation mode is switched to the first operation mode, the movable apparatus resumes the autonomous movement.

8. The autonomous mobile apparatus according to claim 1, having an operation mode including a first operation mode and a second operation mode,
wherein the processor is further configured to:
  detect a height from a reference surface;
  determining whether the detected height from the reference surface is equal to or larger than a reference value;
  switch the operation mode from the first operation mode to the second operation mode in response to determining that the detected height from the reference surface is equal to or larger than the reference value; and
  switch the operation mode from the second operation mode to the first operation mode in response to determining that the detected height from the reference surface is equal to or smaller than the reference value; and
wherein the autonomous mobile apparatus further comprises a movable apparatus configured to perform autonomous movement, and
wherein when the operation mode is switched to the second operation mode, the movable apparatus is configured to stop the autonomous movement, and when the operation mode is switched to the first operation mode, the movable apparatus is configured to resume the autonomous movement.

9. The autonomous mobile apparatus according to claim 8,
wherein the processor is further configured to:
  confirm with a user whether or not to switch the operation mode; and
wherein before switching the operation mode, the processor is configured to obtain a confirmation result on whether or not to switch the operation mode, and switch the operation mode in accordance with the obtained confirmation result.

10. An autonomous movement method comprising:
referring to environment map information of an environment that was previously generated;
controlling an autonomous mobile apparatus to autonomously move to a portion of the environment;
detecting a change in height of the portion of the environment relative to a reference height;
determining whether the change in height is equal to or larger than a reference threshold; and in response to detecting that the change in height is equal to or larger than the reference threshold, stopping updating the environment map information with respect to the height of the portion of the environment or deleting the environment map information that has been updated with respect to the height of the portion of the environment.

11. The autonomous movement method according to claim 10, further comprising:
performing autonomous movement in a movement step; and
in response to detecting that the change in height is equal to or larger than the reference threshold, stopping the autonomous movement.

12. The autonomous movement method according to claim 10, further comprising:
performing autonomous movement in a movement step;
determining whether an amount of fluctuation of the height is an amount indicating an increase equal to or larger than a reference value within a reference time; and
in response to determining that the amount of fluctuation of the height is the amount indicating the increase equal to or larger than the reference value within the reference time, stopping the autonomous movement.

13. A non-transitory computer-readable recording medium recording therein a program to cause a computer of an autonomous mobile apparatus to execute:
referring to environment map information of an environment that was previously generated;
controlling the autonomous mobile apparatus to autonomously move to a portion of the environment; detecting a change in height of the portion of the environment relative to a reference height; determining whether the change in height is equal to or larger than a reference threshold; and in response to detecting that the change in height is equal to or larger than the reference threshold, stopping updating the environment map information with respect to the height of the portion of the environment or deleting the environment map information that has been updated with respect to the height of the portion of the environment.

* * * * *